(12) United States Patent
Ratzi

(10) Patent No.: US 7,096,756 B2
(45) Date of Patent: Aug. 29, 2006

(54) SINTERED CONNECTING ROD FOR AN INTERNAL COMBUSTION ENGINE

(75) Inventor: Raimund Ratzi, Wels (AT)

(73) Assignee: Miba Sintermetall Aktiengesellschaft, Laakirchen (AT)

( * ) Notice: Subject to any disclaimer, the term of this patent is extended or adjusted under 35 U.S.C. 154(b) by 182 days.

(21) Appl. No.: 10/381,500

(22) PCT Filed: Sep. 12, 2001

(86) PCT No.: PCT/AT01/00285

§ 371 (c)(1),
(2), (4) Date: Sep. 3, 2003

(87) PCT Pub. No.: WO02/27200

PCT Pub. Date: Apr. 4, 2002

(65) Prior Publication Data

US 2004/0025627 A1    Feb. 12, 2004

(30) Foreign Application Priority Data

Sep. 26, 2000   (AT) .............................. A 1620/2000

(51) Int. Cl.
*F16C 7/00* (2006.01)
(52) U.S. Cl. .................................................... 74/579 R
(58) Field of Classification Search .............. 74/579 R; 123/197.3
See application file for complete search history.

(56) References Cited

U.S. PATENT DOCUMENTS

| | | | |
|---|---|---|---|
| 683,553 A * | 10/1901 | Carter | ............................ 68/75 |
| 3,559,503 A | 2/1971 | Elsbett | |
| 4,691,590 A * | 9/1987 | Geringer et al. | .......... 74/579 E |
| 5,193,413 A | 3/1993 | Kizler et al. | |
| 5,524,507 A | 6/1996 | Olmr et al. | |
| 5,551,782 A * | 9/1996 | Arnhold et al. | ............. 384/294 |
| 5,617,820 A | 4/1997 | Beardmore et al. | |
| 5,660,086 A * | 8/1997 | Carey | ....................... 74/579 E |

FOREIGN PATENT DOCUMENTS

| | | |
|---|---|---|
| DE | 28 07 298 | 8/1979 |
| DE | 32 49 581 | 8/1984 |
| FR | 1 390 186 | 6/1965 |
| GB | 2 255 613 | 11/1992 |
| JP | 07 279942 | 10/1995 |
| WO | WO 90/14185 | 11/1990 |

* cited by examiner

Primary Examiner—Vicky A. Johnson
(74) Attorney, Agent, or Firm—Collard & Roe, P.C.

(57) ABSTRACT

A sintered connecting rod for an internal combustion engine comprises a connecting rod eye (1) for receiving a piston pin, a connecting rod big end (3) for holding the crank pin and a shaft (2) made of two diverging longitudinal bridges (4) which are optionally stiffened by a connecting bridge (5) and whose mutually facing bridge flanks (11) are connected in the zone of the connecting rod big end (3) by a central concave rounding (9). In order to ensure advantageous loading conditions it is proposed that the longitudinal bridges (4) of the shaft (2) diverge from the connecting rod big end (3) to the connecting rod eye (1).

6 Claims, 3 Drawing Sheets

__US 7,096,756 B2__

SINTERED CONNECTING ROD FOR AN INTERNAL COMBUSTION ENGINE

CROSS REFERENCE TO RELATED APPLICATIONS

Applicant claims priority under 35 U.S.C. §119 of Austrian Application No. A1620/2000, filed Sep. 26, 2000. Applicant also claims priority under 35 U.S.C. §365 of PCT/AT01/00285, filed Sep. 12, 2001. The international application under PCT article 21(2) was not published in English.

1. Technical Field

The invention relates to a sintered connecting rod for an internal combustion engine with a connecting rod eye for receiving a piston pin, with a connecting rod big end for holding the crank pin and with a shaft made of two diverging longitudinal bridges which are optionally stiffened by a connecting bridge and whose mutually facing bridge flanks are connected in the zone of the connecting rod big end by a central concave rounding.

2. Related Art

In order to allow utilizing advantages caused by sintering concerning the adherence to weight tolerances on the one hand and concerning simpler production on the other hand it has already been proposed that connecting rods for internal combustion engines by produced by sintering hot-pressed powder blanks. The shafts of said connecting rods are formed by two longitudinal bridges which are optionally stiffened by a connecting bridge and which diverge from the piston rod eye to the piston rod big end. This embodiment of connecting rods was capable of meeting the static and dynamic strength requirements, especially in the case of vehicle engines, this being despite the lower strength of the sintered connecting rods in comparison with forged connecting rods. Due to the larger shaft width in the transitional region to the connecting rod big end, such sintered connecting rods are hardly suitable for use in short-stroke internal combustion engines because the larger shaft width in the transitional region to the connecting rod big end considerably reduces the possible pivoting angle of the connecting rod which must not touch the cylinder. Efforts to reduce the shaft width in the transitional region to the connecting rod big end by parallel bridges and smaller transitional radii on the outside flanks of the longitudinal bridges have led to an impermissible reduction of the security against fatigue fractures, especially in the region of the oil ducts which are provided directly adjacent to the shafts in the connecting rod big ends in order to supply oil for lubricating and cooling purposes to the cylinders and pistons via the crank shaft.

DESCRIPTION OF THE INVENTION

The invention is thus based on the object of providing a sintered connecting rod of the kind mentioned above in such a way that it can be used for short-stroke internal combustion engines without endangering sufficient security against fatigue fractures.

The invention achieves this object in such a way that the longitudinal bridges of the shaft diverge from the connecting rod big end to the connecting rod eye.

Since as a result of this measure the shaft width decreases from the connecting rod eye to the connecting rod big end, it is possible to ensure connecting rod dimensions, despite sufficiently large transitional radii between the outside shaft flanks and the connecting rod big end, which allow an unlimited use in short-stroke internal combustion engines, namely with a sufficient security against fatigue fractures. The bridges of the shaft which diverge towards the connecting rod eye produce an even distribution of stress in the transitional region between the connecting rod eye and the shaft, which supports the even loading of the two longitudinal bridges of the shaft and provides advantageous prerequisites for pressing the piston pin into the connecting rod eye. In the region of the connecting rod big end, however, a stress concentration is obtained in the transitional region by the converging longitudinal bridges which leads to the effect that the regions adjacent to the circumferential side are relieved. This contributes positively to the stress state in the region of an oil duct, if any, which comes to lie in the region of this stress relief, so that the critical stresses in the region of the oil ducts are within a permissible magnitude. The embodiment of the sintered connecting rods in accordance with the invention thus allows adjusting the dynamic strength behavior to the occurring loads in an advantageous manner and ensuring a sufficient security against fatigue fractures even in critical regions.

Since the stress concentration in the transitional region between the shaft and the connecting rod big end depends on the arrangement of the rounding between the inner bridge flanks of the longitudinal bridges, it is possible to having an influence on the fatigue fracture behavior by way of the arrangement of said rounding. As a result, the bridge flanks and the central rounding can mutually converge by way of connecting roundings for the purpose of a further-reaching relief of the circumferential regions of the piston rod big end which are adjacent to the shaft, with the axes of said connecting roundings being situated outside of the shaft on the side of the opposite longitudinal bridge. As a result of this measure it is possible to reduce the radius of the central rounding irrespective of the progress of the bridge flanks, which leads to the desired stress concentration. The axes of the connecting roundings which are situated outside of the shaft and which allow a continuous transition between the bridge flanks and the central rounding ensure sufficiently large radii of curvature for the connecting roundings in order to ensure an advantageous stress progress within the longitudinal bridges of the shaft. Especially advantageous constructional conditions are obtained in this connection when the radii of curvature of the connecting roundings correspond to at least ten times, preferably at least twenty times, the radius of the central rounding. The radius of the central rounding should not exceed a maximum value of 5 mm.

Although the angle under which the two longitudinal bridges of the shaft diverge depends on different constructional parameters, advantageous conditions are obtained for most applications when the two longitudinal shafts diverge under a minimum angle of 2°.

BRIEF DESCRIPTION OF THE DRAWINGS

The object of the invention is explained below in an exemplary manner by reference to the enclosed drawings, wherein.

EMBODIMENTS OF THE INVENTION

Figure 1:
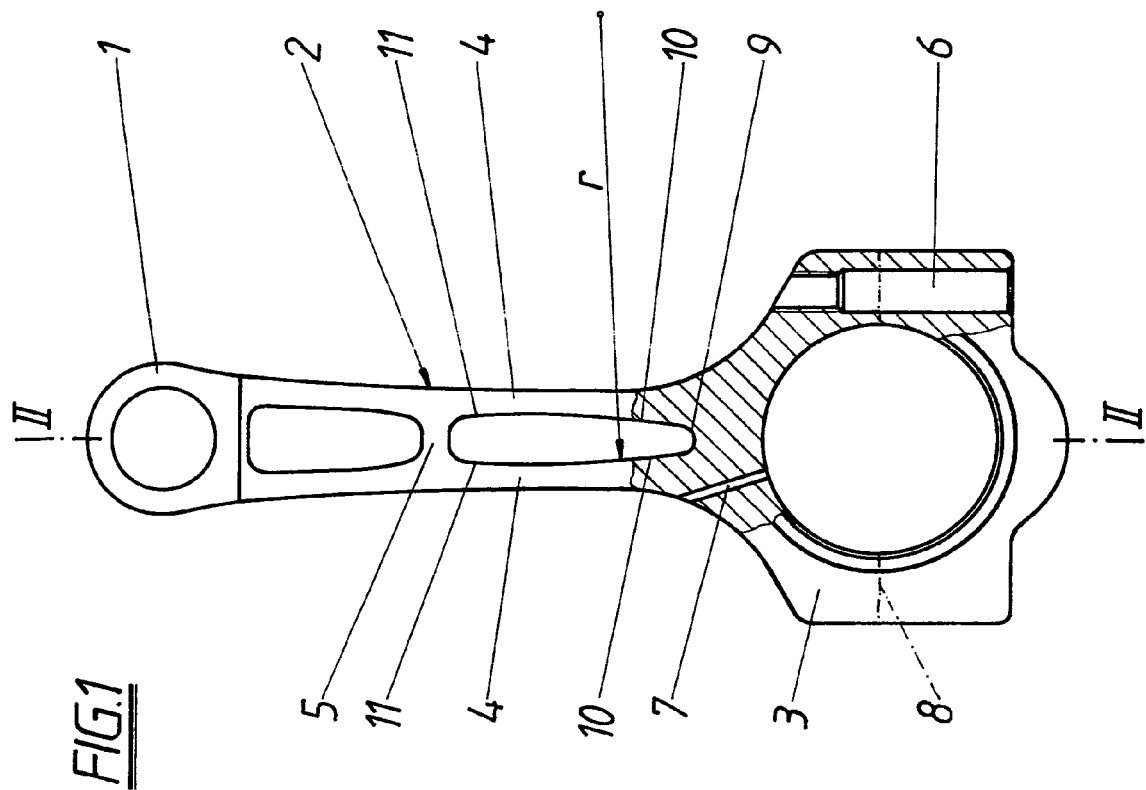
FIG. 1 shows a sintered connecting rod in accordance with the invention for an internal combustion engine in a schematic, partly vertical sectional view.
Figure 2:
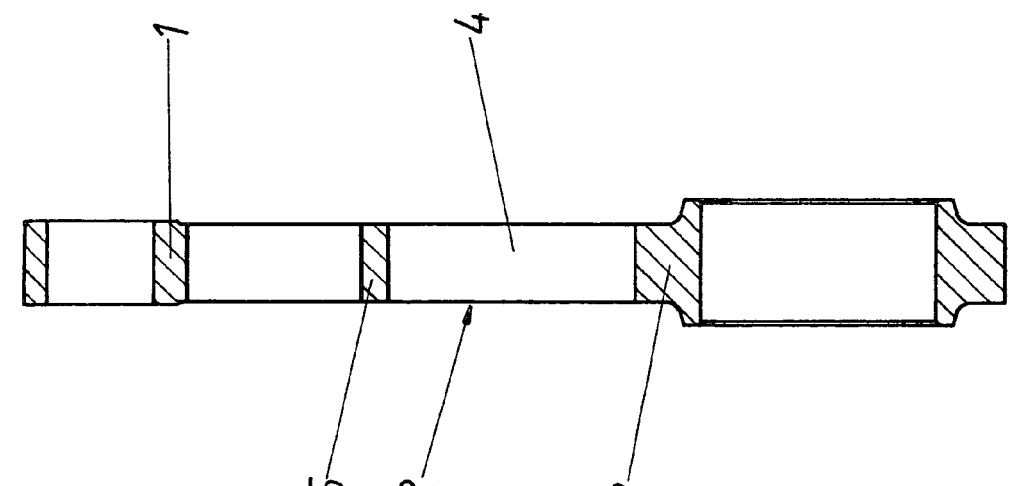
FIG. 2 shows said connecting rod in a sectional view along line II—II in FIG. 1.

The illustrated connecting rod shows in the conventional manner a connecting rod eye 1 for pressing in a piston pin, a shaft 2 and a connecting rod big end 3 at the other end of shaft 2. Shaft 2 is formed by two longitudinal bridges 4 which diverge from the connecting rod big end 3 towards the connecting rod eye 1 and are stiffened by a connecting bridge 5 in order to ensure the highest possible natural frequency.

In order to produce this connecting rod, a molded body made of a suitable sintering powder is hot-pressed at first before said molded body is provided with bores 6 for screw-type bearings and with an oil duct 7. After the sintering of the molded body, the connecting rod big end can be divided by means of separation by breakage along a predetermined breaking surface 8 which is indicated in FIG. 1 in a dot-dash line, so that the a respective cap piece of the crank pin bearing as is to be received by the connecting rod big end 3 is obtained.

Figure 3:
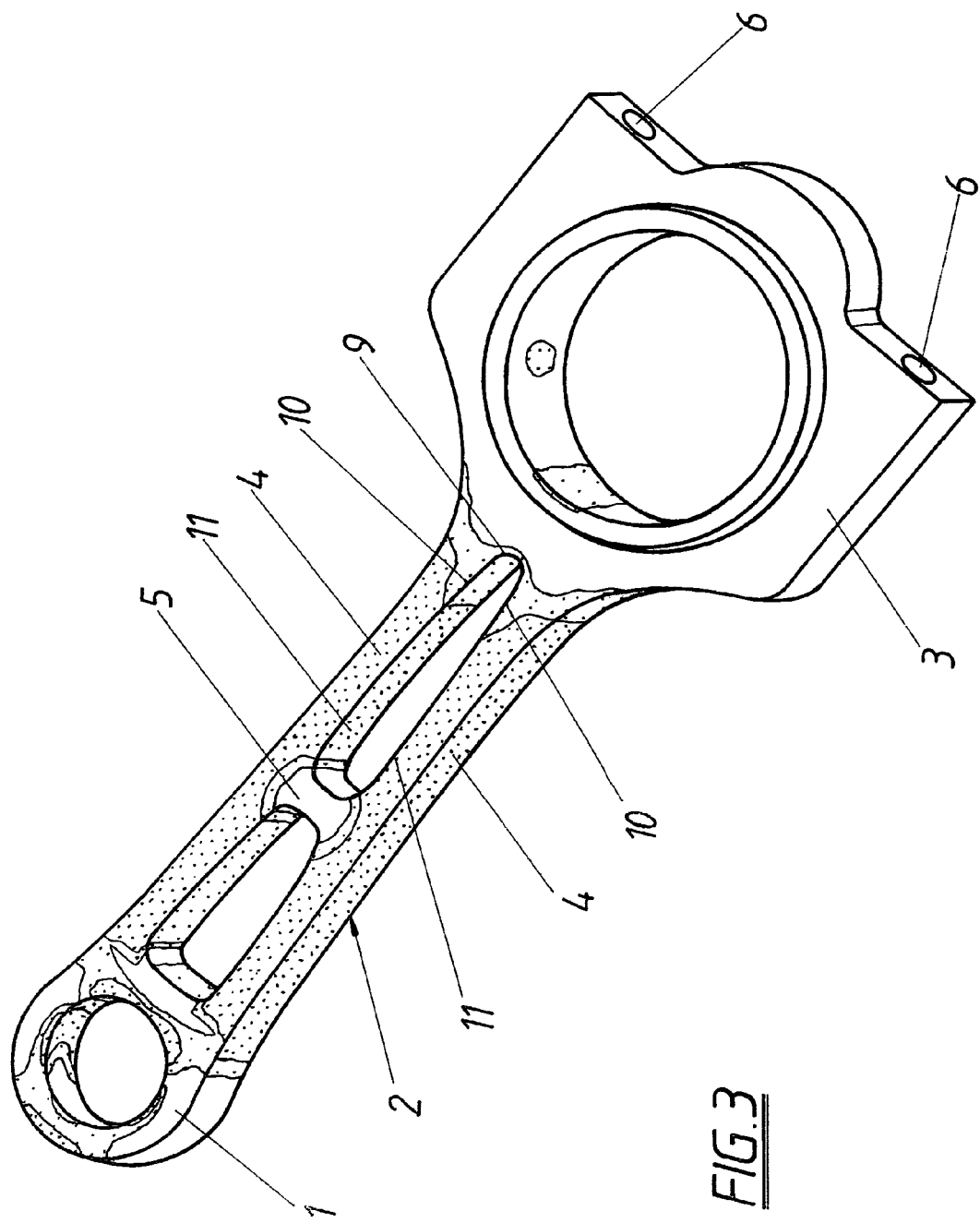
FIG. 3 shows a sintered connecting rod in accordance with the invention in a simplified graphical representation in which regions with different security against fatigue fracture are entered.
Figure 4:
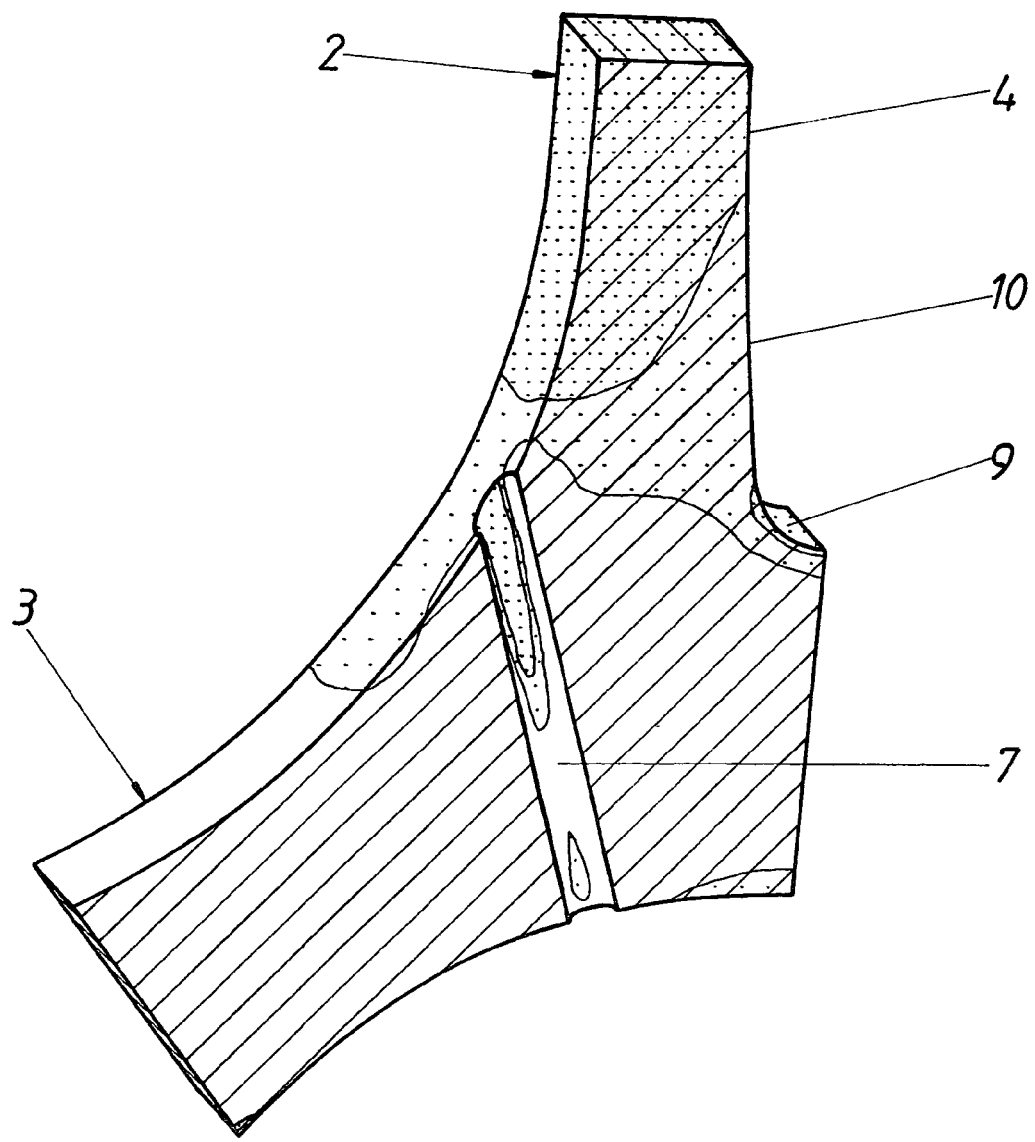
FIG. 4 shows a section of a connecting rod in accordance with the invention in an axially normal sectional view through the connecting rod big end in the region of the oil duct on an enlarged scale, with regions with different security against fatigue fractures also being shown.

As a result of the dynamic strain on connecting rods, the security against fatigue fractures in respect of such connecting rods is of particular importance. In order to compensate the lower strength of sintered connecting rods and to limit the shaft width in the transitional region towards the connecting rod big end 3, the longitudinal bridges 4 of shaft 2 converge against the connecting rod big end 3. The thus resulting shifts in stresses in the occurring pressure, tensile and bending loads lead to different securities against fatigue fractures in said regions in combination with the respective strength properties of said regions, as are indicated in FIGS. 3 and 4 according to respective calculations. The regions of the connecting rod without the dots show a security against fatigue fracture which is higher than 3.5. The regions with few dots show a security against fatigue fracture of between 2.5 and 3.5 and the regions with more dots show a security against fatigue fracture of between 1.6 and 2.5. As is shown in FIG. 4, the security against fatigue fracture in the region of the oil duct 7 lies over the required value of 1.6. this is only possible because the region of the oil duct 7 can be relieved by a stress concentration in the central region between the two longitudinal bridges 4. This stress concentration is achieved by a central rounding 9 between the longitudinal bridges 4 which shows a comparatively small rounding radius of 2.5 mm for example. In order to provide such a rounding 9 with a small diameter between the longitudinal bridges 4 without obtaining an unfavorable stress distribution in the longitudinal bridges, the rounding 9 converges continuously via connecting curvatures 10 into mutually facing bridge flanks 11, with the radius of curvature r of said connecting curvatures 10 corresponding to 50 times the radius of rounding 9 for example. These ratios of dimensions are indicated in FIG. 1.

Favorable stress distributions are also obtained in the region of the connecting rod eye 1 as a result of the longitudinal bridges 4 which diverge towards said connecting rod eye 1 under an angle of 4° for example, which stress distributions allow pressing in the piston pin. The securities against fatigue fracture lie above the required minimum values also in the region of the connecting rod eye 1.

The invention claimed is:

1. A sintered connecting rod for an internal combustion engine, which has a connecting rod eye for receiving a piston pin, a connecting rod big end for holding a crank pin and a shaft comprised of two diverging longitudinal bridges whose facing bridge flanks are connected at the connecting rod big end by a central concave rounding , wherein the longitudinal bridges of the shaft diverge from the connecting rod big end to the connecting rod eye to increase the distance between the longitudinal bridges in a direction from the connecting rod big end to the connecting rod eye.

2. A connecting rod as claimed in claim 1, wherein the bridge flanks and the central rounding converge into each other via connecting roundings whose axes are each situated outside of the shaft on the side of the opposite longitudinal bridge.

3. A connecting rod as claimed in claim 1, wherein the radii of curvature of the connecting roundings correspond at least to 10 times the radius of the central rounding.

4. A connecting rod as claimed in claim 1, wherein the two longitudinal bridges of the shaft diverge under a minimum angle of 2°.

5. A connecting rod as claimed in claim 1, wherein the radii of curvature of the connecting roundings correspond to at least twenty times the radius of the central rounding.

6. A connecting rod as claimed in claim 1, further comprising a stiffening bridge connecting the longitudinal bridges.

\* \* \* \* \*